March 7, 1967 — H. C. BEHRENS ETAL — 3,307,390
METHOD OF AND APPARATUS FOR TESTING CONTAINERS
Filed Sept. 12, 1963
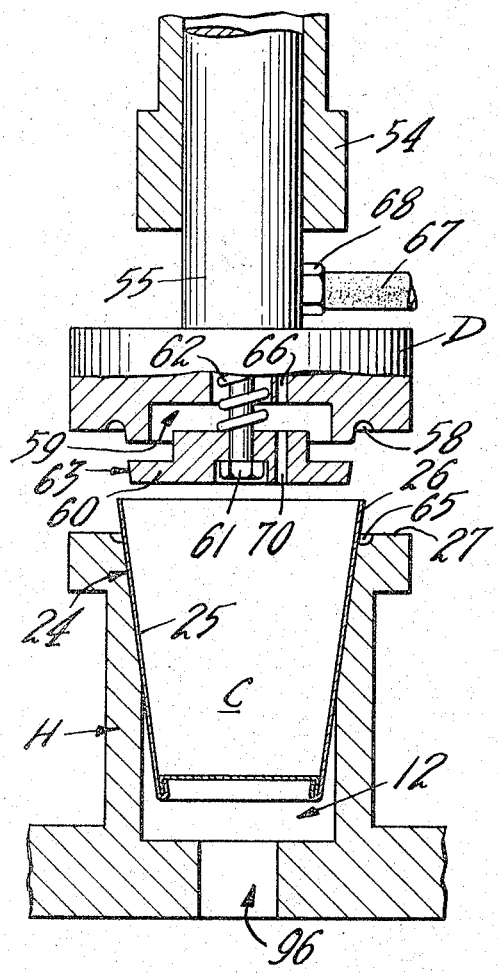
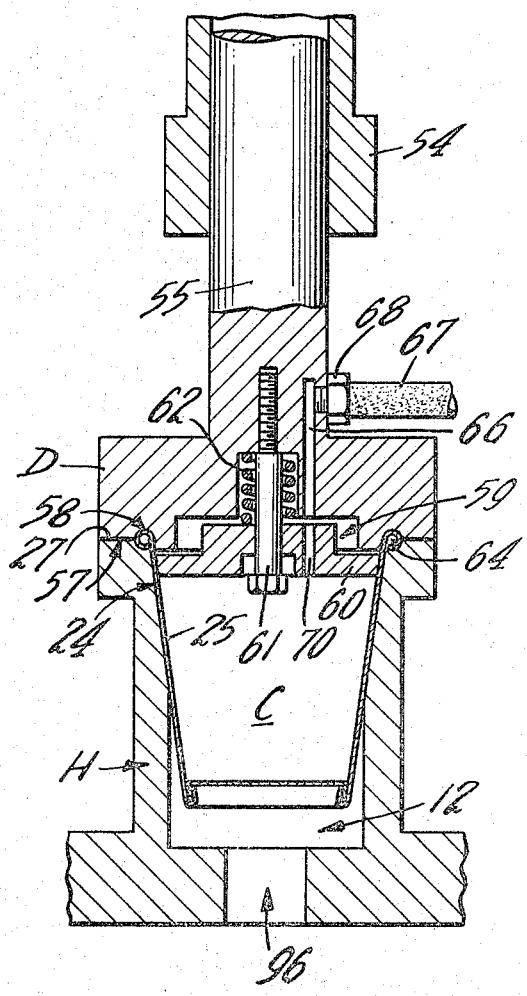
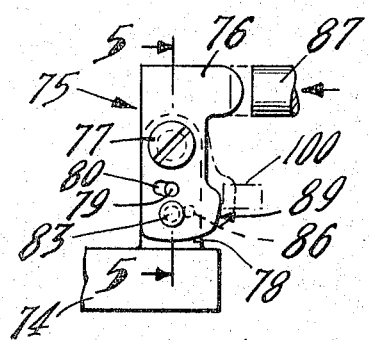
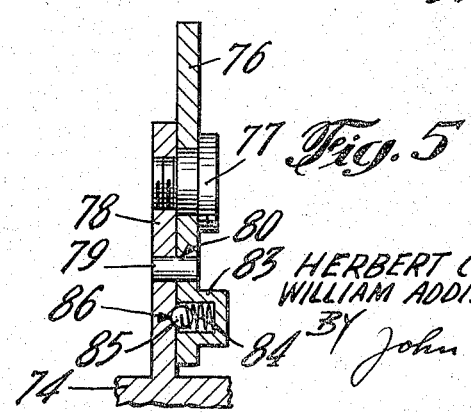
INVENTORS
HERBERT CHARLES BEHRENS
WILLIAM ADDISON SHENINGER
BY John H. Midney
ATTORNEY 3,307,390
METHOD OF AND APPARATUS FOR TESTING CONTAINERS
Herbert Charles Behrens, Easton, Pa., and William Addison Sheninger, Alpha, N.J., assignors to American Can Company, New York, N.Y., a corporation of New Jersey
Filed Sept. 12, 1963, Ser. No. 308,526
20 Claims. (Cl. 73—45.2)

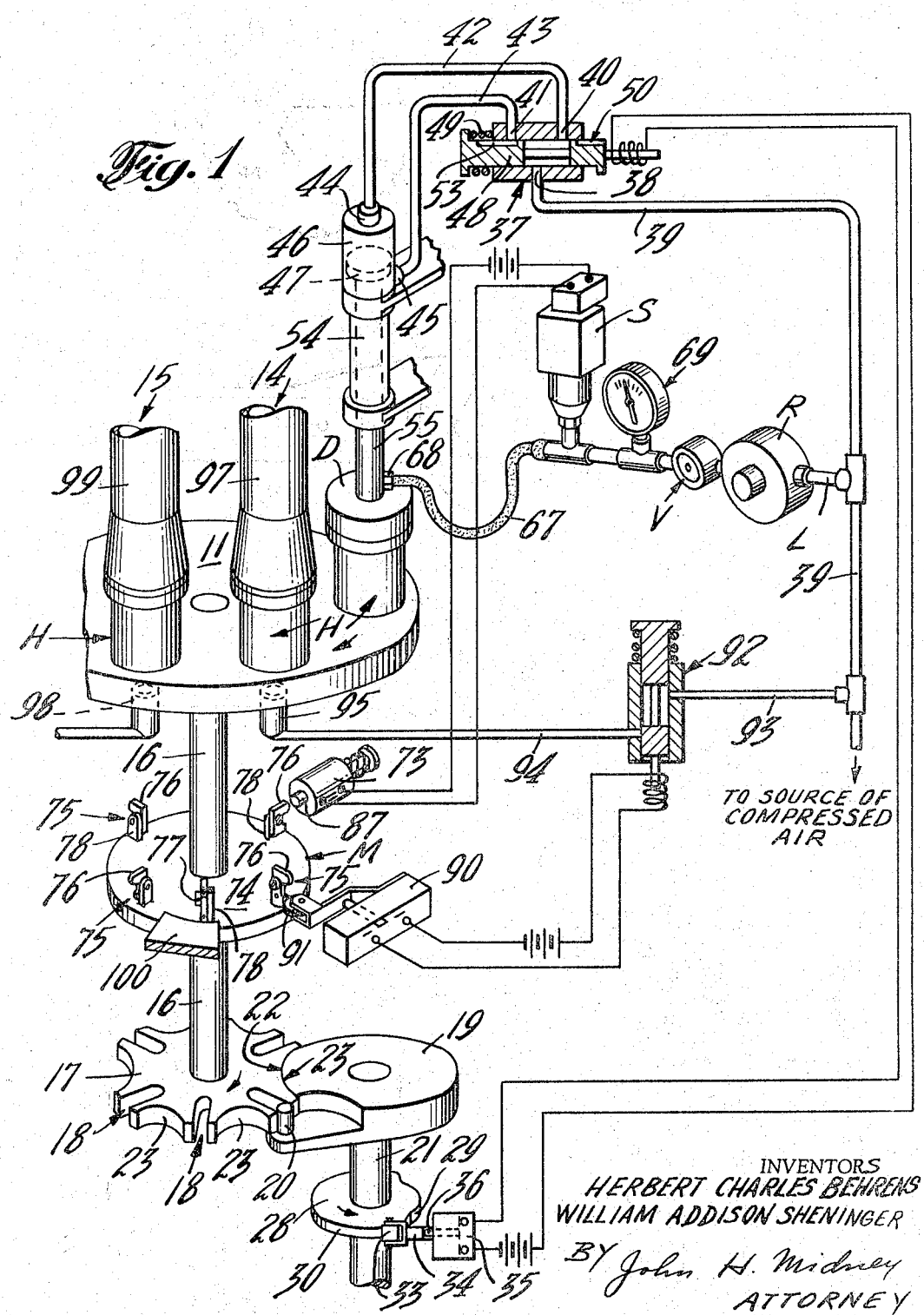

The present invention relates to a method of and apparatus for pneumatically detecting leaks in open-ended containers having a curled or rolled edge at the open end thereof and has particular reference to the non-destructive leak testing of paper containers concurrently with and as part of the process of forming the curled or rolled edge at the open end of the container.

The commercial manufacture of paper containers such as disposable cups is generally performed at high speeds on complex automated machinery. Each of the operative steps of the manufacturing process is accomplished in an extremely short interval of time and therefore requires very precise equipment for positioning and holding the parts and forming the container. However, the elements of the positioning and forming equipment are subject to wear, breakage, loss of adjustment or may otherwise function improperly with the result that some defective leaky containers are inevitably produced. Since the ultimate use of a container such as a paper cup is generally to hold liquids, and a leakage therefrom during use is not only a nuisance but can also result in staining and serious damage to clothing or other articles with which the liquid contents leaking from the container may come into contact, it is imperative that insofar as possible imperfect cups be detected and discarded.

Heretofore, the method generally used for detecting leaks in paper containers has been the wet leak detection method. By this method, sample test containers are taken from the machine at fixed intervals and filled with a liquid containing a colored dye. After a fixed period of time has elapsed, the exterior of the container is visually examined for any evidence of the dye coloring which would indicate a leakage path through the container.

It is apparent that with the wet leak detection method, the sample test containers become contaminated with the colored liquid and must be discarded. More important, the containers are continually being produced as the test is being conducted and a considerable number of containers may have been produced before the results of a particular test indicate that the containers are being improperly formed. Further tests must then be conducted to determine how many of the containers, which were produced before and after the defective sample was taken from the machine, must be discarded. Alternatively, and as is often the case, all of the containers made since the last acceptable tested sample are discarded. In either case, it is apparent that the wet leak detection method can be wasteful and expensive.

Moreover, the wet leak detection method fails to detect the occasional leaker which may result, for example, because of a pinhole or other defect in the container material. Generally, the user of the cup would not be able to visually observe or detect such a defect, and only after the cup is in use will the leak become apparent with the attendant nuisance involved.

Accordingly, an object of the present invention is to provide a method of detecting leaks in open-ended paper containers which will overcome the problems hereinbefore pointed out.

Another object is to provide such a method having no detrimental effects on the containers being tested.

Another object is to provide such a method wherein every cup is individually tested during and as part of the container forming operation.

Another object is to provide such a method wherein the leak testing is done simultaneously with an existing cup forming operation.

Another object is to provide an apparatus for pneumatically detecting leaks within a variable range of magnitude in open-ended containers.

Still a further object is to provide such an apparatus which can be adjusted to reject all containers which leak in excess of a predetermined standard.

Numerous other objects and advantages of the invention will be apparent as it is better understood from the following description, which, taken in connection with the accompanying drawings, discloses a preferred embodiment thereof.

Referring to the drawings:

FIG. 1 is a perspective view of an apparatus embodying features of the present invention;

FIG. 2 is an enlarged sectional view of the container holder and the top curl forming head as positioned prior to the formation of the top curl on the container;

FIG. 3 is a sectional view similar to FIG. 2 at the completion of the forming of the top curl on the open end of the container;

FIG. 4 is an enlarged side elevation of a microswitch operator;

FIG. 5 is an enlarged sectional view taken substantially along line 5—5 of FIG. 4.

The aforementioned objects are accomplished in the present invention by providing a holder H adapted to retain and position an open-ended container C beneath a curling head D with the unrolled edge of the open end adjacent the die (FIG. 2). The curling head D is forced against the edge of the open end to roll or curl it outwardly (FIG. 3). During this operation, the head D forms a substantially gas tight seal with the edge of the open end of the container C along its entire periphery. A passage through the head D communicating with the interior of the container C is connected by a pipeline L to a source of compressed air, the air flowing first through a pressure regulator R which regulates the pressure of the air and then through a needle valve V positioned downstream of the pressure regulator R which controls the rate of flow of the air into the container (FIG. 1). During the interval in which the head D is forming the rolled bead and is in sealing engagement with the open end of the container, the pressurized air flowing into the container creates a pressure increase therein which is dependent upon the presence and size of any leakage paths through the container. A pressure switch S connected to the pipeline L downstream of the valve V senses the pressure increase in the container and is closed to energize an electrical circuit when the pressure in the container reaches a predetermined value indicating no, or negligible, leakage. The energization of the electrical circuit activates a memory device M whereby acceptable cups are automatically passed and defective cups automatically rejected.

As a preferred or exemplary embodiment of the instant invention, FIG. 1 shows an intermittently revolvable turret 11 having a number of container holders H positioned thereon in an equally spaced circular pattern. Each container holder H has a cavity 12 adapted to receive therein a container C (FIG. 2) when the holder is positioned at a feed station (not shown) in a manner which is well understood in the art. As the turret 11 is intermittently rotated, the holders H support and successively position the containers C at a combined rim curling and leak testing station 13, at an acceptable container discharge station 14, and at a rejected container discharge station 15.

In the embodiment shown, the turret 11 is provided with six container holders H (only three being shown in FIG. 1) corresponding to six stations, two being idle stations.

A shaft 16 secured to and extending downwardly from the turret 11 is rotatably mounted in suitable bearings (not shown), the bearings being positioned and held in a suppotring machine frame (not shown) in an appropriate manner. A Geneva wheel 17 is also secured to the shaft 16 and has equally spaced radial slots 18 corresponding in number to the number of container holders H on the turret 11.

For intermittently rotating the turret 11, a disk 19 carrying a Geneva operating pin 20 is mounted on a drive shaft 21. The drive shaft 21 is mounted for rotation in suitable bearings in the machine frame (not shown) and is continuously rotated in any suitable manner. During each revolution of the shaft 21 and disk 19, the pin 20 enters a slot 18 of the Geneva wheel 17 and rotates the wheel one-sixth of a revolution, or through an angle of 60 degrees, thereby indexing the turret 11 to advance the container holders H successively to each station. A circular surface 22 on the disk 19 slidably engages a mating surface 23 on the Geneva wheel 17 to maintain the turret 11 in a fixed position for a period corresponding to five-sixths of a revolution of the drive shaft 21 and disk 19, during which period the operations are effected at each station as hereinafter described.

A container C which has been completely formed with the exception of the top curl is deposited into the cavity 12 of the holder H at a feed station (not shown) with the open end of the container uppermost. An upper portion 24 of the cavity 12 conforms in size and shape to an upper sidewall portion 25 of the container C whereby the upper portion 24 of the cavity abuts and supports the container along the upper sidewall portion 25 with an upper rim portion 26 extending above the uppermost surface 27 of the container holder H (FIG. 2).

A disk cam 28 secured to the drive shaft 21 has surfaces 29 and 30 in rolling contact with a roller 33 mounted on an actuating lever 34 of a normally open electrical switch 35. The lever 34 is spring biased towards the cam surfaces 29 and 30 to maintain the roller 33 in continuous contact therewith. During the portion of the rotation of the shaft 21 in which the pin 20 is in engagement with a slot 18 of the Geneva wheel 17 to index the turret 11, the roller 33 is maintained in contact with the cam surface 29 and the lever 34 assumes a position wherein the switch 35 is open.

After the completion of the indexing operation and the pin 20 is disengaged from the Geneva wheel slot 18, the cam surface 30 is brought into contact with the roller 33 causing the lever 34 to be moved away from the cam 28 to depress a pin 36 of the switch 35 and close the switch. In its closed position, the switch 35 connects a two-position solenoid valve 37 to a suitable electric voltage source thereby energizing the valve. The cam surface 30 maintains the switch 35 in the closed position until just prior to the entry of the pin 20 into a slot 18 to perform another indexing operation of the turret 11, at which time the roller 33 again becomes in contact with the cam surface 29 and the switch opened to deenergize the valve 37.

The valve 37 has an inlet port 38 connected by tubing 39 to a suitable source of compressed air. The valve 37 has two outlet ports 40 and 41 connected by tubing 42 and 43 respectively to upper and lower ports 44 and 45 respectively of a pneumatic actuating cylinder 46 having a piston 47. The valve 37 has a slide 48 spring biased to the left as shown in FIG. 1 by the action of a spring 49. When the valve is de-energized, with the slide 48 moved fully to the left by the spring 49, the inlet port 38 is connected to the outlet port 41 and the compressed air allowed to flow into the lower portion of the cylinder 46 through the lower port 45. The upper port 44 is vented to the atmosphere through a channel 50 in the slide 48.

The piston 47 is thus maintained in an upward position while the valve 37 is de-energized.

When the cam 28 causes the switch 35 to be closed thereby energizing the valve 37, the slide 48 is moved to the right against the action of the spring 49 to the position as shown in FIG. 1. In this position, the inlet port 38 is connected to the outlet port 40 and the compressed air allowed to flow into the upper portion of the cylinder 46 through the upper port 44. The lower port 45 is vented to the atmosphere through a channel 53 in the slide 48. The piston 47 is thereby caused to move downwardly towards the container C which is positioned at the combined rim curling and leak testing station 13.

The cylinder 46 is mounted on a stationary machine frame member 54. A piston rod 55 attached to the piston 47 extends downwardly from the cylinder 46 through the frame member 54. A curling head D attached to the lower end of the rod has a lower annular stop surface 57 disposed outwardly from an annular rounded groove 58 and a centrally disposed stepped cavity 59. A disk shaped locking member 60 disposed below the cavity 59 is slidably mounted on a stud 61 which is threadably secured to the curling head D. A compression spring 62 disposed in the cavity 59 above the locking member 60 urges the locking member downwardly to abut the head of the stud 61.

The locking member 60 has an outer surface 63 corresponding in shape to the inner surface of the upper sidewall portion 25 of the container C. As the piston 47 is moved downwardly in the manner heretofore described, the locking member 60 enters the mouth of the container C until the surface 63 abuts the innersurface of the upper sidewall portion 25 of the container. Further downward movement of the piston 47 causes the spring 62 to be compressed so that it continuously exerts a downward force on the locking member 60. Consequently, the upper sidewall portion 25 of the container C is compressed between the surface 63 of the locking member 60 and the upper portion 24 of the cavity 12 of the holder H thereby locking the container in position in the holder. Immediately thereafter, the uppermost edge of the upper rim portion 26 of the container is engaged by the rounded groove 58 of the curling head D. The continued downward movement of the curling head D causes the rim portion 26 to be rolled outwardly to form it into a rolled bead 64. The holder H is provided with an annular groove 65 having a rounded surface which forms a continuation of the rounded surface of the annular groove 58 of the curling head D and assists in the formation of the rolled bead 64. When the surface 57 of the curling head D abuts the surface 27 of the holder H, further downward movement of the curling head is prevented and the rolled bead 64 is fully formed.

During the formation of the rolled bead 64, the spring 62 continuously forces the locking member 60 downwardly to maintain the container C in the locked position in the holder H. Also during the formation of the rolled bead 64, a seal is formed between the annular groove 58 of the curling head D and the upper rim portion 26 of the container C. Depending upon the material of which the container C is made, this seal may be substantially gas tight, or may permit a small amount of leakage. In any event, for any given type of containers C, the seal will be consistent for each container and any leakage through the seal under identical gaseous pressure conditions within the containers will be substantially the same.

The curling head D is connected to a source of compressed gas which is made to flow from a passage 66 in the curling head at a predetermined pressure and rate of flow. As shown in FIG. 1, the compressed gas employed is compressed air which flows from the tubing 39 through connecting tubing L. The compressed air passes first through a pressure regulator R and needle valve V which adjustably control the pressure and the rate of flow of the air respectively, and thence through a flexible hose 67 which connects the tube L to a fitting 68 communicating with the passage 66. A visual pressure indicating gauge 69 and a pressure sensing electrical switch S are connected to the tubing L downstream of the needle valve V and regulator R.

In the preferred embodiment shown in FIG. 1, the compressed air flows continuously from the passage 66 in the curling head D. Consequently, as soon as the annular groove 58 of the curling head 56 engages the rim portion 26 of the ocntainer C and forms a seal therewith as it curls the rim portion outwardly, the air flowing from the passage 66 flows into and becomes confined within the container, a passage 70 being provided in the locking member 60 for this purpose. Depending upon the presence or absence of leaks in the container C, the air flowing into the container creates a pressure rise therein during the interval in which the curling head D is in sealing engagement with the mouth of the container. This pressure rise is sensed by the pressure switch S which is designed to close an electrical circuit and energize a solenoid actuator 73 when the pressure rise in the container during the aforementioned interval reaches a predetermined value.

The predetermined value of pressure rise is initially set by adjustment of the needle valve V while containers which are known to be non-leakers, or to be within acceptable leakage tolerances, are being run through the apparatus. Adjustment of the needle valve V is continued until the pressure switch S closes just before the curling head D moves upwardly and releases the pressure in the container C. Thereafter as the containers C are continuously run through the apparatus, the solenoid actuator 73 will be energized in the case of each container having a leakage no greater than the acceptable tolerance. Any container C which has a total leakage greater than the acceptable tolerance will experience a pressure rise less than that required to close the pressure switch S and accordingly the solenoid actuator will not become energized.

The solenoid actuator 73 is a component of a memory device M designed to receive an indication that a container C which is being tested at the combined rim curling and leak testing station 13 is, or is not, acceptable. As the container holder H having the tested container C therein is subsequently indexed to the acceptable container discharge station 14 and rejected container discharge station 15, the memory device M causes the container to be discharged in accordance with the indication it has previously received.

The memory device M has a disk member 74 which is secured to and revolves with the turret shaft 16. The disk member 74 has mounted thereon in an equally spaced circular pattern switch operators 75 corresponding in number to the number of container holders H on the turret 11. The switch operators 75 have arms 76 oscillatably mounted on studs 77 which threadably engage upright lugs 78 (FIGS. 4 and 5). The lugs 78 are welded or otherwise secured to the disk member 74. Pins 79 which are secured to and extend from the lugs 78 through elongated slots 80 in the arms 76 limit the movement of the arms between a vertical position (solid lines in FIG. 4) and an inclinned position (dashed lines FIG. 4).

Each arm 76 has a hollow cylindrical boss 83 with a compression spring 84 disposed therein. The spring 84 urges a spherical ball 85 against the adjacent surface of the lug 78. Each lug 78 has two spaced spherical depressions 86 into which the ball 85 enters to yieldingly hold the arm 76 in either the inclined or vertical positions corresponding to the limits of movement of the arm permitted by the pin 79 and slot 80.

As each container holder H having a container C therein is positioned at the combined rim curling and leak testing station 13, a corresponding switch operator 75 is positioned adjacent the solenoid actuator 73 with its arm 76 disposed in the vertical position and yieldingly held in this position by the combined action of the spring 84, ball 85, and one of the spherical depressions 86 as hereinbefore described. If the actuator 73 becomes energized due to closing of the switch S, indicating that the container C is acceptable, an armature 87 is directed against an upper surface 88 of the arm 76. This causes the arm 76 to be oscillated from the vertical position to the inclined position whereby a lower surface 89 of the arm is moved outwardly. The arm 76 is maintained in the inclined position by the combined action of the spring 84 and ball 85 against the other spherical depression 86 in the lug 78.

As each container holder H is indexed to the acceptable container discharge station 14, its corresponding switch operator 75 is likewise indexed to a position adjacent a normally open microswitch 90, whereupon the lower surface 89 of the arm 76 contacts or fails to contact a roller element 91 of the microswitch depending upon whether the arm is in the inclined or vertical position respectively. With the arm 76 in the inclined position, indicating that the container holder H positioned at the acceptable container discharge station 14 has an acceptable container C therein, the resulting contact between the surface 89 and roller element 91 closes the microswitch thereby connecting a solenoid valve 92 to a suitable electric volage source which energizes the valve.

The solenoid valve 92 has an inlet connected by tubing 93 to the source of compressed air, and an outlet connected by tubing 94 to an upwardly directed nozzle 95. The nozzle 95 is disposed below the turret 11 and has its discharge opening in alignment with a passage 96 in the turret communicating with the cavity 12 of the container holder H. Upon becoming energized, the valve 92 connects the tubing 93 to the tubing 94 permitting compressed air to flow to the nozzle 95. This air is discharged upwardly from the nozzle 95 at a substantial velocity, flows through the passage 96 into the cavity 12 of the container holder H, and blows the acceptable container C resting therein upwardly into a conduit 97. The conduit 97 conveys the acceptable container to a point where it is packaged or otherwise processed.

If the leakage test of a container C has established that it is not within the acceptable leakage tolerances, the arm 76 of the switch operator 75 corresponding to the container holder H having the particular container therein remains in the vertical position as previously described. Consequently, as the container holder H and continer C are indexed to the acceptable container discharge station 14, the surface 89 of the arm 76 fails to engage the roller element 91 of the microswitch 90. The microswitch 90 is thus not closed and the valve 92 remains in its normal de-energized position wherein it prevents the flow of compressed air from the tubing 93 to the tubing 94 and nozzle 95. Consequently, the container C is not ejected from the holder H at the acceptable container discharge station 14, and is moved to the rejected container discharge station 15 during the following indexing cycle of the turret 11.

At the rejected container discharge station 15, the holder H is positioned above an upwardly directed nozzle 98 disposed below the turret 11 with its discharge opening in alignment with the passage 96 through the turret. A stream of air of a substantial velocity flows continuously from the nozzle 98. This air passes upwardly through the passage 96 into the cavity 12 and blows any container C which may be supported within the holder H into a conduit 99. The conduit 99 conveys the rejected containers C to a scrap bin or other waste receptacle.

During each indexing cycle one of the arms 76 passes adjacent a fixed guide member 100 which engages the lower surface 89 of the arm if it is in the inclined position. The guide member 100 moves the arm 76 from the inclined position back to the vertical position, so that each switch operator 75 has its arm 76 in the vertical position as it is indexed to a position adjacent the solenoid actuator 73.

It is readily apparent that the apparatus described which exemplifies the method steps of the subject invention, provides an efficient and relatively inexpensive way of individually and non-destructively leak testing a container simultaneously with the forming of a curled or rolled edge at the open end of the container. It is to be understood, however, that the principles of the invention are not limited to the specific embodiment described, and that various modifications may be made without departing from those principles. For example, suitable timing and valving devices may be used to fix the interval during which the leak test is conducted to a time period which is less than the total time during which the curing head is in sealing engagement with the open end of the container to form the rolled bead thereon. Also, other types of memory devices having various combinations of mechanical, electrical or electronic elements, as are well known in the art, may be substituted for the memory device M described herein.

The apparatus can be preset to detect leaks in containers equivalent to any selected standard ranging in magnitude from leakage attributable to minute porosity in the walls of the container to leakage due to actual holes of relatively large size in the container wall. For example, if it is desired to reject all containers having total leakage openings greater than the equivalent of an .015 inch diameter hole, the sidewalls of a quantity of containers known to be non-leakers are perforated using special precise punches to produce holes of .015 inch diameter in some and .018 inch diameter in others. The containers having the smaller perforation are processed through the apparatus while the needle valve V is being adjusted so that the pressure switch S closes an instant before the curling head D moves upwardly to break its sealing contact with the container. The sensitivity of the apparatus is checked by periodically running a container having the larger diameter hole. Since, with the larger hole the increased leakage should prevent the pressure in the container from reaching, in the available time, the pressure necessary to cause the pressure switch S to be closed, the container should be rejected. If this does not occur, the device is again readjusted using test containers with the smaller .015 inch diameter hole.

As has been previously described, with the apparatus properly adjusted and with acceptable containers being processed, the contacts of the pressure switch S remain closed for but a fraction of a second due to the close timing between the closing of the switch and the release of the pressure in the container as the curling head D is disengaged from the container and moved upwardly. Provision for monitoring the sensitivity adjustment can therefore simply and easily be included by connecting an indicator lamp, electric buzzer, electric bell, or some similar type of device in series with the solenoid actuator 73. If the apparatus is properly adjusted, the rapid time sequence between the closing and opening of the pressure switch S, assuming an acceptable container is being tested, will cause a current to flow to the lamp, buzzer or bell for such a short interval that the lamp filament will only be made to glow dimly, or the buzzer or bell barely to sound. If the indicator lamp glows brightly, or the bell or buzzer repeatedly sounds loudly and for relatively long intervals, which would mean that the pressure switch S is being prematurely closed due to overly rapid pressure build-up in the containers, the operator will be immediately alerted to the fact that the sensitivity must be checked and readjusted in the manner hereinbefore described. On the other hand, if the indicator lamp repeatedly fails to glow even dimly, or the bell or buzzer to sound, the operator will be alerted to the fact that either the containers are being defectively formed or the material is faulty, in which case the cause of the defects can be determined and corrected, or the operator will be alerted to the necessity for checking and readjusting the sensitivity in the manner described above.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

What we claim is:

1. A method of detecting leaks in an open ended container while simultaneously forming a rolled bead on the open end thereof comprising the steps of: closing the open end of the container while simultaneously forming an outwardly rolled bead thereon, introducing a gas at a predetermined pressure and rate of flow into said container during said bead forming operation, and measuring the pressure increase in said container during said bead forming operation.

2. The method set forth in claim 1 including the additional steps of comparing the pressure increase in said container during said bead forming operation with a fixed pressure differential, and rejecting all containers wherein said pressure increase is less than said fixed pressure differential.

3. The method set forth in claim 2 wherein said fixed pressure differential is adapted to be adjusted to reject containers in accordance with varying standards of leakage tolerance.

4. A method of detecting leaks in an open ended container while simultaneously forming a curled rim on the open end thereof comprising the steps of: bringing a curling die into contact with the rim of the open end of the container along the entire periphery thereof, said curling die closing the open end of said container, forcing said curling die against said rim of said container to curl said rim outwardly and at the same time forming a substantially gas tight seal between said rim of said container and said curling die, flowing gas at a predetermined pressure and rate of flow through said curling die into said closed container for a time interval concurrent with said rim curling operation and while said curling die is in sealing contact with said rim of said container, and comparing the maximum pressure in said container during said interval with a predetermined pressure.

5. The method set forth in claim 4 wherein said time interval is equal to the total period during which said curling die is in sealing contact with said rim of said container.

6. The method set forth in claim 4 wherein said time interval is less than the total period during which said curling die is in sealing contact with said rim of said container.

7. The method set forth in claim 4 wherein said container comprises a fiber material.

8. The method set forth in claim 7 wherein said fiber material has a liquid impervious layer laminated thereto, said liquid impervious layer being disposed interiorly of the container and being in sealing contact with said curling die during said rim curling operation.

9. The method set forth in claim 8 wherein said liquid impervious layer consists essentially of a polymer of an ethylenically unsaturated monomer.

10. The method set forth in claim 8 wherein said liquid impervious layer is a film of polyethylene.

11. The method set forth in claim 4 wherein said container is a paper cup.

12. An apparatus for detecting leaks in an open ended container while simultaneously forming a rolled bead on the open end thereof comprising: die means for rolling an edge portion of the open end of said container outwardly to form said rolled bead, said die means having a peripheral portion forming a substantially gas tight seal with the entire edge portion of said container as said edge portion is being rolled outwardly and having a central portion closing said open end, means for admitting a gaseous fluid at a predetermined pressure and rate of flow through said central portion of said die means into the interior of said container for a predetermined time interval while said peripheral portion is in sealing engagement with said edge portion of said container, and means for sensing the pressure increase in said container during said interval.

13. The apparatus set forth in claim 12 wherein said time interval is equal to the total period during which said peripheral portion of said die means is in sealing engagement with said edge portion of said container.

14. The apparatus set forth in claim 12 wherein said time interval is less than the total period during which said peripheral portion of said die means is in sealing engagement with said edge portion of said container.

15. An apparatus for detecting leaks in an open-ended container while simultaneously forming a curled rim on the open end thereof comprising: means for positioning said container beneath a curling die with the open end of said container facing and in alignment with said curling die, means for moving said curling die into contact with the peripheral edge portion of said open end to curl said edge portion outwardly and form a curled rim on said container, said curling die forming a subtantially gas tight seal with the edge portion of said container about its entire periphery as said edge portion is being curled outwardly to form said curled rim, said curling die having a central portion which seals said open end, a passage through said central portion communicating with the interior of said container, means for admitting a gas at a predetermined pressure and rate of flow through said passage into the interior of said container for a predetermined time interval while said curling die is in sealing engagement with said open end, and pressure responsive means for sensing the pressure increase in said container during said interval.

16. The apparatus set forth in claim 15 wherein said means for admitting a gas into the interior of said container includes a valve connecting said passage to a source of a gas at a preset pressure and adapted when open to admit said gas into said container at a predetermined rate of flow.

17. The apparatus set forth in claim 16 wherein said valve is adjustable whereby the rate of flow of said gas may be varied.

18. The apparatus set forth in claim 16 including timing means adapted to open said valve for said predetermined time interval.

19. The apparatus set forth in claim 15 wherein said pressure responsive means comprises a pressure switch adapted to energize an electrical circuit when a predetermined pressure increase is attained within said container during said interval.

20. The apparatus set forth in claim 15 having means associated with said pressure responsive means for selectively removing all containers wherein a predetermined pressure increase is not attained within said container during said interval.

References Cited by the Examiner
UNITED STATES PATENTS 1,087,074    2/1914    Tevander _____ 73—452

LOUIS R. PRINCE, *Primary Examiner.*

M. B. HEPPS, *Assistant Examiner.*